(12) United States Patent
Kram et al.

(10) Patent No.: US 10,100,898 B2
(45) Date of Patent: Oct. 16, 2018

(54) TORSIONAL VIBRATION DAMPER

(71) Applicants: Matthias Kram, Volkach (DE); Volker Stampf, Schweinfurt (DE); Jörg Sudau, Niederwerrn (DE); Christoph Sasse, Schweinfurt (DE); Armin Stürmer, Rannungen (DE); Michael Wirachowski, Wurzburg (DE); Ying Dong, Bergrheinfeld (DE); Friedrich Kokott, Bergrheinfeld (DE); Daniel Pittner, Gerbrunn (DE); Oliver Andres, Bamberg (DE); Simone Vierneusel, Konigsberg-Holzhausen (DE); Dennis Egler, Espenau (DE)

(72) Inventors: Matthias Kram, Volkach (DE); Volker Stampf, Schweinfurt (DE); Jörg Sudau, Niederwerrn (DE); Christoph Sasse, Schweinfurt (DE); Armin Stürmer, Rannungen (DE); Michael Wirachowski, Wurzburg (DE); Ying Dong, Bergrheinfeld (DE); Friedrich Kokott, Bergrheinfeld (DE); Daniel Pittner, Gerbrunn (DE); Oliver Andres, Bamberg (DE); Simone Vierneusel, Konigsberg-Holzhausen (DE); Dennis Egler, Espenau (DE)

(73) Assignee: ZF Friedrichshafen AG, Friedrichshafen (DE)

(*) Notice: Subject to any disclaimer, the term of this patent is extended or adjusted under 35 U.S.C. 154(b) by 18 days.

(21) Appl. No.: 14/439,194

(22) PCT Filed: Sep. 30, 2013

(86) PCT No.: PCT/EP2013/070306
§ 371 (c)(1),
(2) Date: Apr. 28, 2015

(87) PCT Pub. No.: WO2014/067728
PCT Pub. Date: May 8, 2014

(65) Prior Publication Data
US 2015/0285332 A1 Oct. 8, 2015

(30) Foreign Application Priority Data
Oct. 29, 2012 (DE) .................. 10 2012 219 737

(51) Int. Cl.
*F16F 15/14* (2006.01)

(52) U.S. Cl.
CPC ......... *F16F 15/145* (2013.01); *Y10T 74/2128* (2015.01)

(58) Field of Classification Search
CPC ............................. F16F 15/14; F16F 15/145
See application file for complete search history.

(56) References Cited

U.S. PATENT DOCUMENTS

| 2014/0041479 A1* | 2/2014 | Dinger | F16F 15/12353 |
| | | | 74/574.4 |
| 2015/0316124 A1* | 11/2015 | Wirachowski | F16F 15/145 |
| | | | 464/51 |

FOREIGN PATENT DOCUMENTS

| DE | 196 31 989 | 9/1997 |
| DE | 10 2009 042 818 | 5/2010 |

(Continued)

Primary Examiner — Vicky A Johnson
(74) Attorney, Agent, or Firm — Cozen O'Connor

(57) ABSTRACT

A torsional vibration damper has a damper mass carrier at which is received at least one damper mass movable relative to the damper mass carrier and with at least one stop. The at least one damper mass has a stop side with a geometric shaping. At least one stop is associated with the damper mass, and has an axial overlap with the at least one damper mass in extension direction of a central axis and a stop (Continued)

profile at its side facing the stop side of the damper mass. At least one stop receiver is associated with the least one stop for the at least one damper mass. The geometric shaping which is provided at the at least one damper mass has a first contact region operative at least substantially in radial direction and a second contact region operative at least substantially in tangential direction. The first contact region can be brought into operative connection with the stop, and the second contact region can be brought into operative connection with the stop receiver.

19 Claims, 13 Drawing Sheets

(56) References Cited

FOREIGN PATENT DOCUMENTS

| | | | |
|---|---|---|---|
| DE | 10 2011 086 436 | 6/2012 | |
| FR | 1049924 A * | 1/1954 | ............. F16F 15/14 |
| WO | WO 2011147632 A2 * | 12/2011 | ............ F16F 15/145 |

* cited by examiner

TORSIONAL VIBRATION DAMPER

CROSS REFERENCE TO RELATED APPLICATIONS

This is a U.S. national stage of application No. PCT/EP2013/070306, filed on Sep. 30, 2013. Priority is claimed on German Application No.: DE102012219737.0, filed Oct. 29, 2012, the content of which is incorporated herein by reference.

BACKGROUND OF THE INVENTION

1. Field of the Invention

The present invention is directed to a torsional vibration damper provided with a damper mass carrier at which is received at least one damper mass movable relative to the damper mass carrier and at least one stop. The at least one damper mass has a stop side with a geometric shaping and at least one stop is associated with the at least one damper mass. The stop has an at least partial axial overlap with the at least one damper mass in extension direction of a central axis and has, at its side facing the stop side of the damper mass, a stop profile. At least one stop receiver is associated with the least one stop for the at least one damper mass.

2. Detailed Description of Prior Art

A torsional vibration damper is known from DE 10 2009 042 818 A1. According to FIG. 1, this torsional vibration damper has in the radially inner region an annular component part secured to an output-side flywheel mass of the torsional vibration damper and receives a hub disk with play in circumferential direction, this hub disk serving as damper mass carrier. As is shown in particular in FIG. 4, the hub disk serves to receive a plurality of damper masses arranged consecutively in circumferential direction and, to this end, has two guideways for each damper mass, these two guideways being connected to two guideways of the respective damper mass via a rolling body. The damper masses are displaceable in circumferential direction relative to the hub disk until engaging by radial extensions at a flexible stop associated with the respective movement direction. According to the construction in FIG. 1, the flexible stop is provided at the annular component part.

While the damper masses operate sufficiently noiselessly in driving mode, the speed operative at the hub disk and, therefore, the centrifugal force acting on the damper masses drops rapidly in stop phases of the drive, e.g., internal combustion engine, or in vehicle creep mode. As soon as the centrifugal force has dropped below the weight force, the damper masses drop down and generate an undesirable impact noise in their tracks and/or at the stops.

SUMMARY OF THE INVENTION

It is an object of one embodiment of the invention to construct a torsional vibration damper provided with damper masses such that impact noise can be efficiently prevented even in operating phases in which the centrifugal force acting on the damper masses falls below the weight force.

According to a key aspect of the present invention, a torsional vibration damper has a damper mass carrier at which is received at least one damper mass movable relative to the damper mass carrier and with at least one stop. The at least one damper mass has a stop side with a geometric shaping, and at least one stop is associated with the at least one damper mass in each instance, which stop has an at least partially axial overlap with the at least one damper mass in extension direction of a central axis. The stop has a stop profile at the side of the stop facing the stop side of the damper mass, and at least one stop receiver is associated with the least one stop for the at least one damper mass.

According to one embodiment of the invention the geometric shaping provided at the at least one damper mass has at least one first contact region operative at least substantially in radial direction and at least one second contact region operative at least substantially in tangential direction, and the first contact region can be brought into operative connection with the stop, and the second contact region can be brought into operative connection with the stop receiver.

Viewed in circumferential direction, the first contact region of the geometric shaping is preferably located between two second contact regions of the geometric shaping that adjoin at the circumferential end sides. The first contact region is formed of two parts for configuring mutually opposing working directions of the at least one damper mass, each shaping-half being adapted with respect to its shape to the shape of the corresponding profile stop of the associated stop, resulting in a particularly low-noise impact behavior when each shaping-half has, at its side facing the stop profile of the stop, a curvature shape adapted to a curvature shape of the stop profile of the stop.

The situation is comparable with respect to the second contact regions of the geometric shaping. The second contact regions are provided in pairs to mutually oppose working directions of the at least one damper mass, each of the two contact regions being adapted with respect to its shape to the shape of the corresponding stop receiver. To this end, each of the two contact regions narrows at its side facing the corresponding stop receiver along a curvature shape adapted to a curvature shape of this stop receiver.

If a plurality of stops is to be associated with a plurality of damper masses, the stops are advisably received in circumferential direction on a common, preferably at least substantially annular, component part. In operating conditions, for example, when stopping a drive such as an internal combustion engine or in a creep mode at low speed, the centrifugal force acting on the damper masses can drop below the weight force so that the damper masses fall downward through gravitational force until, in guideways connecting them to the damper mass carrier, they engage guideway ends associated with the movement direction. In view of the dropping direction of the damper masses, it would be advisable to arrange the stops and the stop receivers at least partially radially inwardly of the at least one damper mass. Those damper masses located radially above a central axis then fall with their first contact regions on the associated stops and with their second contact regions on the associated stop receivers, while those damper masses located radially below the central axis fall toward one another, so that the mutually facing circumferential ends of the two damper masses are prevented from engaging one another through the action of the first contact regions and possibly also the second contact regions.

In a first case, the stop receivers can be received at a fastening location, for example, at a damper mass carrier, and can be at least substantially pin-shaped; but in a second case the stop receivers can be formed by studs secured to the stop and engage in corresponding receptacles of the fastening location at the damper mass carrier. In the first case, the fastening location, for example, the damper mass carrier, can be configured with two damper mass support elements, which extend parallel to one another, and are held at a fixed distance from one another by spacers, these spacers extending through a holder at the stop in each instance. In the second case, however, the respective holder at the stop is provided for receiving the stud which is intended to engage in a receptacle at the fastening location.

Alternatively, however, the stop receivers can be formed by holding projections which, in each instance, extend through an associated recess or engage therein so as to clip the stop to a fastening location in this way. Component parts of a coupling arrangement, for example, an element of a damping device or of a hydrodynamic circuit, are advantageous as fastening location.

As a further alternative, the stops can be floatingly received with respect to the stop receivers and are therefore movable relative to the stop receivers. When the stops are floatingly received, particularly when they are provided at an annular component part, they can have increased resiliency and, therefore, improved damping characteristics. This can have advantageous results when the damper mass elements engage by their stop sides.

By way of supplementing the stop receivers, the stops can be radially supported at a component part of the coupling arrangement, for example, at an element of the hydrodynamic circuit.

In one embodiment, the spacers extend through the respective holder at the stop with an axial offset between the axis of the respective spacer and the axis of the respective holder. Owing to this axial offset, a free space results between the holder and the respective spacer. This free space promotes an elasticity at the stop in that the wall of the holder impinged by a damper mass can extend elastically into this free space. A solution of this kind is attractive when the radial stops for a plurality of damper masses are collectively arranged on a common, preferably annular, component part that extends radially inwardly of the damper masses and when the axial offset is so configured that the respective free spaces occur in the radially outer regions of the holders. The annular component part is then centered via the radially inner regions of the holders.

BRIEF DESCRIPTION OF THE DRAWINGS

The invention will be described more fully in the following with reference to the accompanying drawings. The drawings show:

FIG. 6 is the stop according to FIG. 3 in an isometric view with holders for stop receivers to pass through;

FIG. 7 is a view similar to FIG. 6, but with holders to which stop receivers are secured;

DETAILED DESCRIPTION OF THE PRESENTLY PREFERRED EMBODIMENTS

Figure 1:
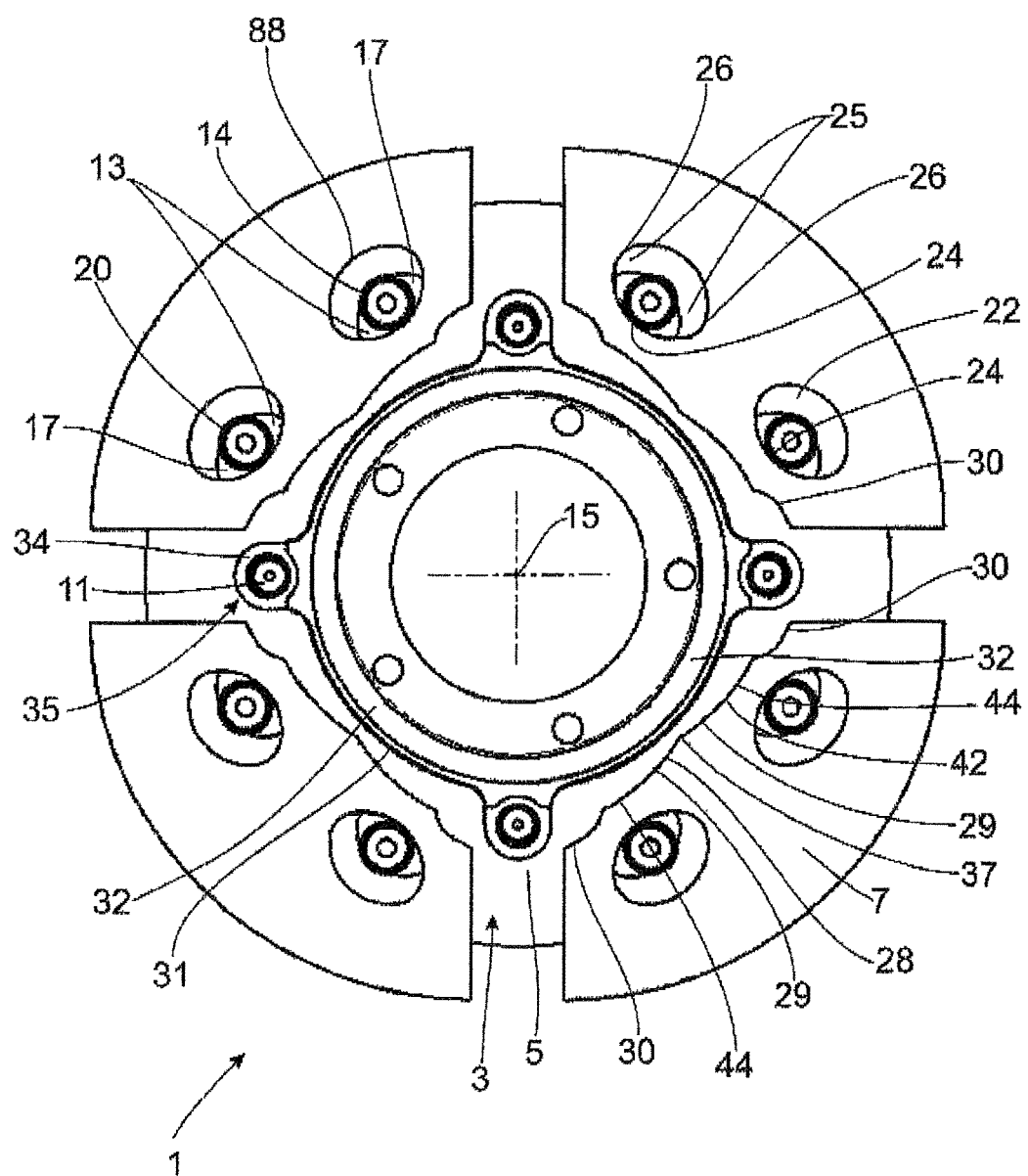
FIG. 1 is a top view of a torsional vibration damper with damper masses and associated stop, wherein the damper masses occupy a position reached when centrifugal force exceeds the force of gravity, but without transmitted torsional vibration.
Figure 9:
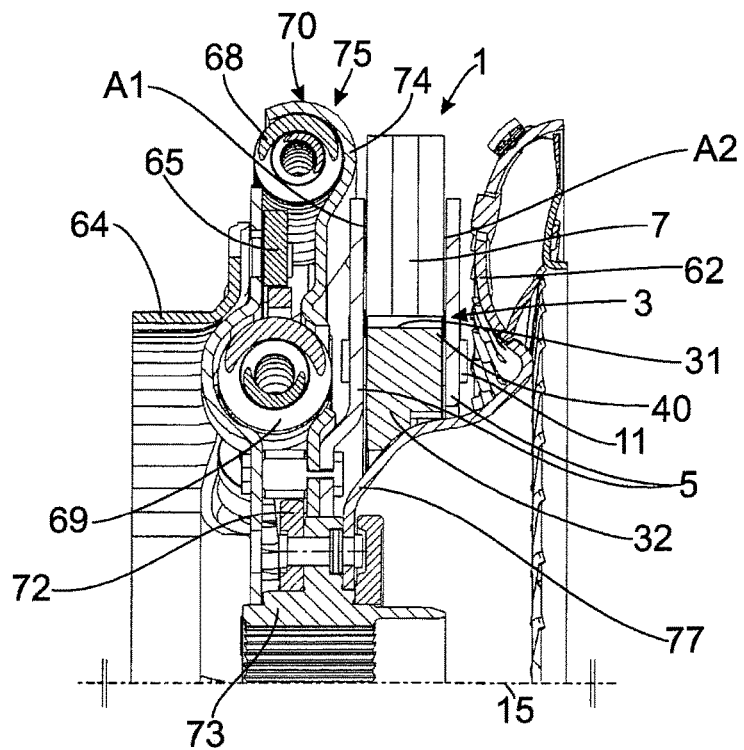
FIG. 9 is a detail of a damping device and of the torsional vibration damper from the coupling arrangement shown in FIG. 8.
Figure 10:
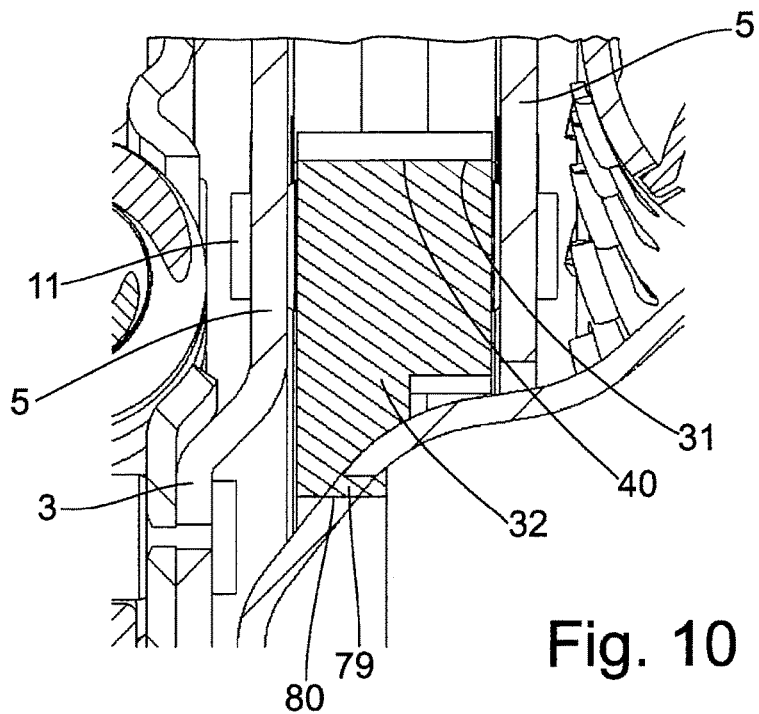
FIG. 10 is a stop with stop receivers which differ from those in the preceding figures and with radial support of the stop at a component part of the coupling arrangement.

FIG. 1 shows a torsional vibration damper 1 with a damper mass carrier 3 that has two axially spaced damper mass support elements 5, of which only the damper mass support element 5 arranged axially behind the damper masses 7 is shown for the sake of a clearer illustration of a plurality of damper masses 7 received at the damper mass carrier 3. The two damper mass support elements 5 are connected to one another by spacers 11. The two damper mass support elements 5 and one of the spacers 11 are also shown in FIG. 9 or FIG. 10. The damper masses 7 are arranged over rolling bodies 20 inside guideways 22 (see FIG. 2), specifically in such a way that the guideways 22 allow a radial relative movement of the damper masses 7 with respect to the spacers 11. The damper masses have, at their radial inner sides, stop sides 42 that will be described more fully.

Guideways 13 are provided in pairs at the damper mass support elements 5 in each instance. Each guideway 13 extends in a curved manner with an initial region 14 in which the respective guideway 13 has the greatest radial distance from a central axis 15 and with connection regions 17 that extend circumferentially opposite one another so as to adjoin at both sides of the initial region 14. A circumferential end 18 of one of the two connection regions 17 is visible in FIG. 2. Of course, the other connection region 17 also has a circumferential end of this type, but this is not shown in the drawing.

One of the rolling bodies 20 is arranged in each of the guideways 13, this rolling body 20 engages in an associated guideway 22 of the damper masses 7, these guideways 22 being arranged in pairs in the damper masses 7. In the diagram shown in FIG. 1, the damper masses 7 tend radially outward under centrifugal force so that the rolling bodies 20 position themselves in each instance in the initial region 24 of the respective guideway 22, i.e., in that region having the shortest radial distance from the central axis 15. Adjoining the initial region 24 are connection regions 25 that extend circumferentially opposite one another and are bounded in circumferential direction by a circumferential end 26 in each instance.

Each of the damper masses 7 has at the radially inner ends thereof a geometric shaping 28 having a first contact region 29 in the circumferentially middle portion, but having second contact regions 30 in the circumferentially outer portions. The first contact region 29 has a region center 37 that divides the first contact region 29 into shaping-halves 44. In a manner described below, this geometric shaping 28 cooperates with stops 31 which are provided radially inwardly of the damper masses 7 and with stop receivers 35 provided at an annular component part 32.

In circumferential direction between every two damper masses 7, the annular component part 32 has a holder 34 that encloses a spacer 11 such that the holder 34 serves as a stop receiver 35. The annular component part 32 is accordingly received at the damper mass support elements 5 and, therefore, at the damper mass carrier 3 so as to be fixed with respect to relative rotation. An annular body 33 extending in circumferential direction acts between every two stop receivers 35 as a stop 31. Accordingly, all of the stops 31 and all of the stop receivers 35 are brought together at the annular component part 32. Alternatively, other solutions, also not shown, in which each stop 31 or a partial group of stops 31 is received via a stop receiver 35 or a partial group of stop receivers 35 at a supporting component part such as the damper mass carrier 3 are conceivable.

Figure 4:
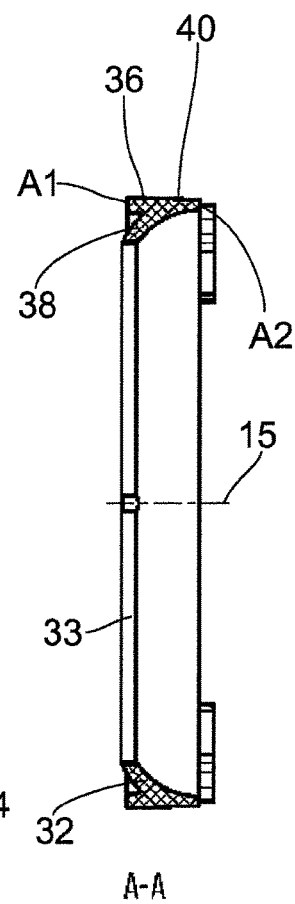
FIG. 4 is the stop according to section line A-A in FIG. 3.

As is shown in the cross sectional view in FIG. 4, the annular component part 32 has an axial flange 36 and a stiffening flange 38 extending with a radial component. At its radially outer side, the axial flange 36 has a stop profile 40.

When the torsional vibration damper 1 is operated at a speed at which the centrifugal force exceeds the weight force, the damper masses 7 tend radially outward under centrifugal force so that the rolling body 20 can position itself in the initial region 24 of the respective guideway 22 of the damper masses 7. While torsional vibrations can force deflections of the damper masses 7 in circumferential direction so that the rolling bodies 20 are deflected out of the initial regions 24 of the guideways 22 into the connection regions 25 thereof, the rolling bodies 20 are always returned to the initial position under centrifugal force as the torsional vibration decays.

Figure 2:
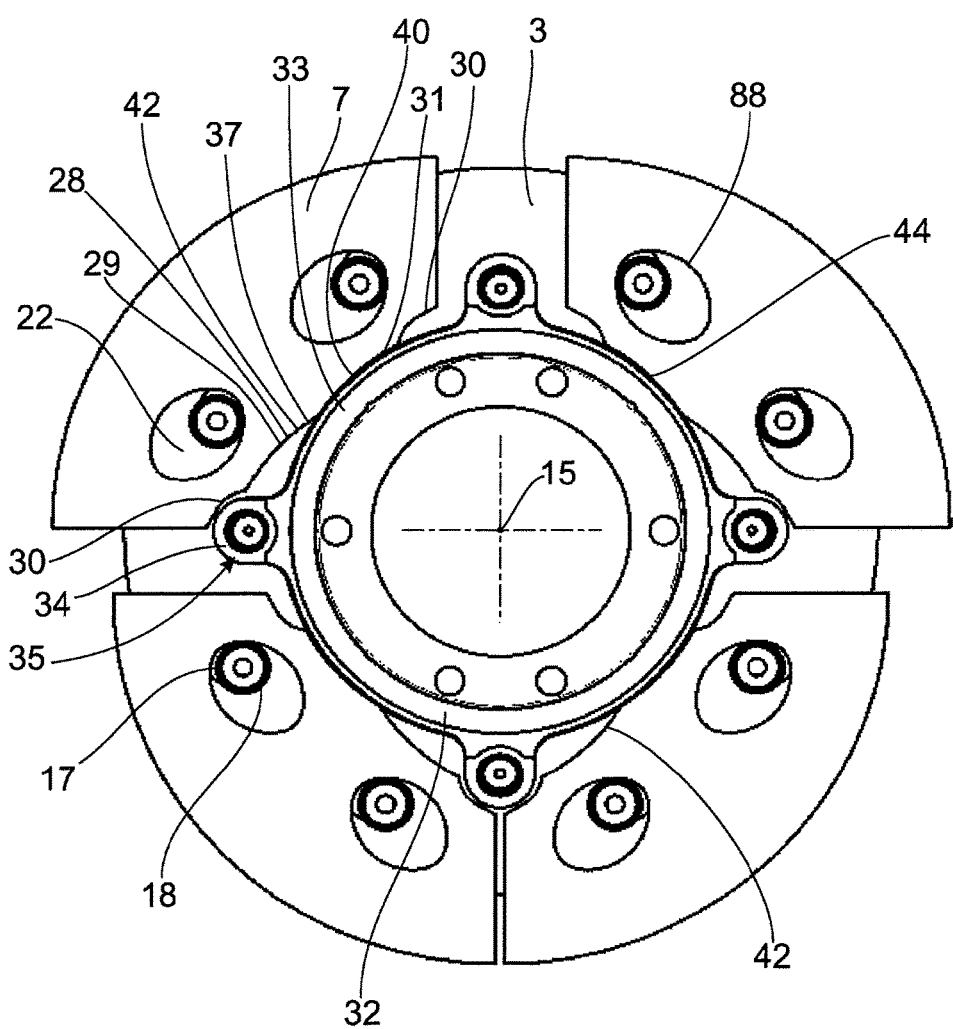
FIG. 2 is a view similar to FIG. 1, but with the damper masses in a position which is occupied when centrifugal force falls below the force of gravity.
Figure 3:
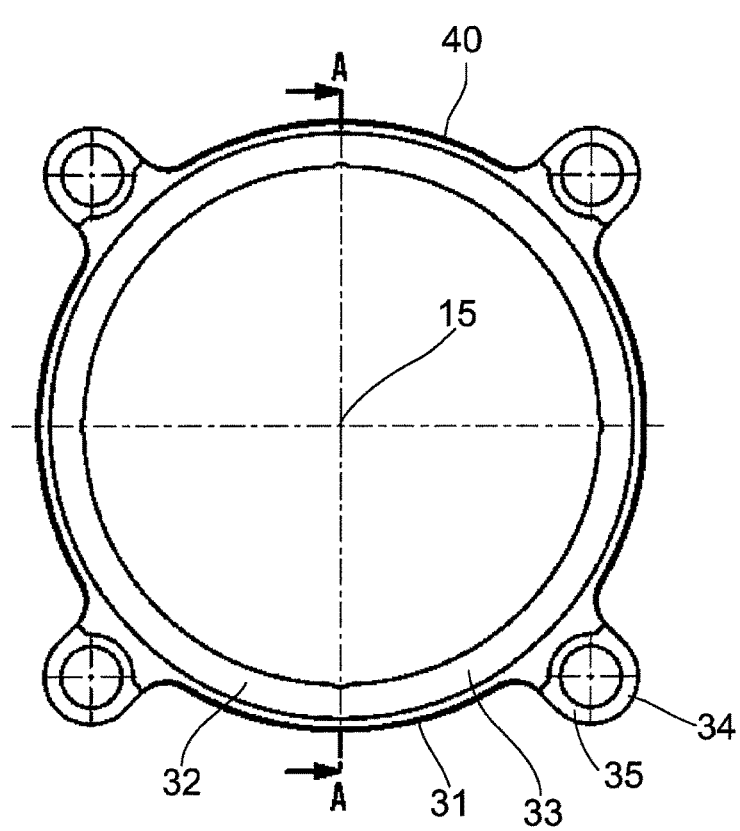
FIG. 3 is a separate illustration of the stop shown in FIG. 1 or FIG. 2.

However, when the centrifugal force drops below the weight force, for example, in creep mode of a motor vehicle or when stopping a drive, e.g., an internal combustion engine, the damper masses 7 drop radially inward occupy a relative position, shown in FIG. 2, with respect to one another and to the damper mass carrier 3. In an operating condition of this type, the two damper masses 7 located radially above the central axis 15 drop radially inward until their stop sides 42 have engaged, by the shaping-halves 44 of the first contact region 29 that are relevant for the movement direction, the associated stop profile 40 of the stop 31 at the annular body 33 of the annular component part 32. If the guideways 22 permit a further movement of the damper masses 7 radially downward, this movement will not end until the second circumferential region 30 of the respective damper mass 7 relevant for the movement direction engages the holder 34 and, therefore, the stop receiver 35 of the annular component part 32. The two damper masses 7 located radially below the central axis 15 likewise drop radially inward until their stop sides 42 have engaged, by the first contact regions 29, which are shaped thereon and which are relevant for the movement direction, the associated stop profile 40 of the stop 31 at the annular body 33 of the annular component part 32 and until, further, the second contact regions 30 of the respective damper masses 7, which second contact regions 30 are relevant for the movement direction, engage the corresponding holders 34 and, therefore, the stop receivers 35 of the annular component part 32. In this way, the two damper masses 7 located radially below the central axis 15 are prevented from engaging one another by their circumferential end edges.

Figure 13:
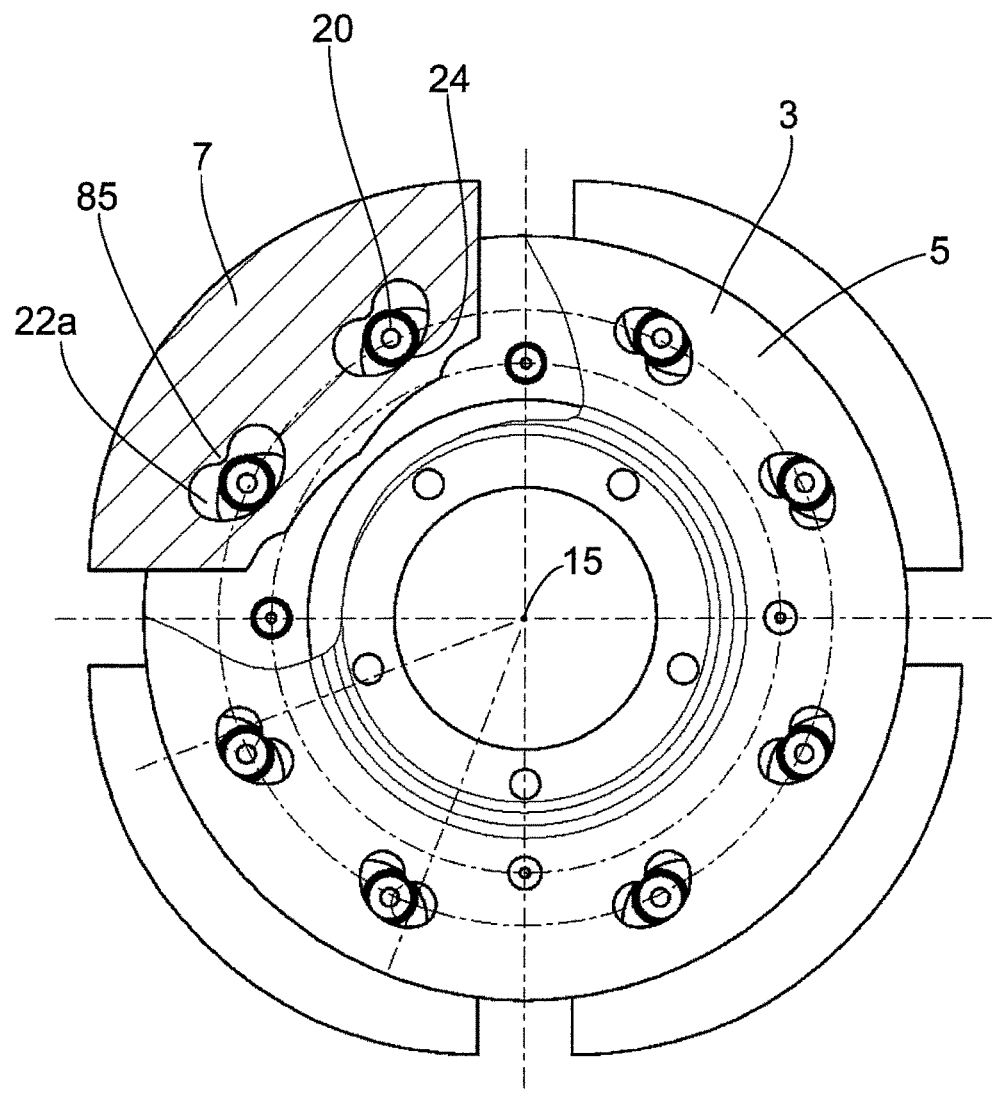
FIG. 13 is a view similar to FIG. 1, but with guideways in the damper masses and in the damper mass carrier corresponding to the prior art for rolling bodies.
Figure 14:
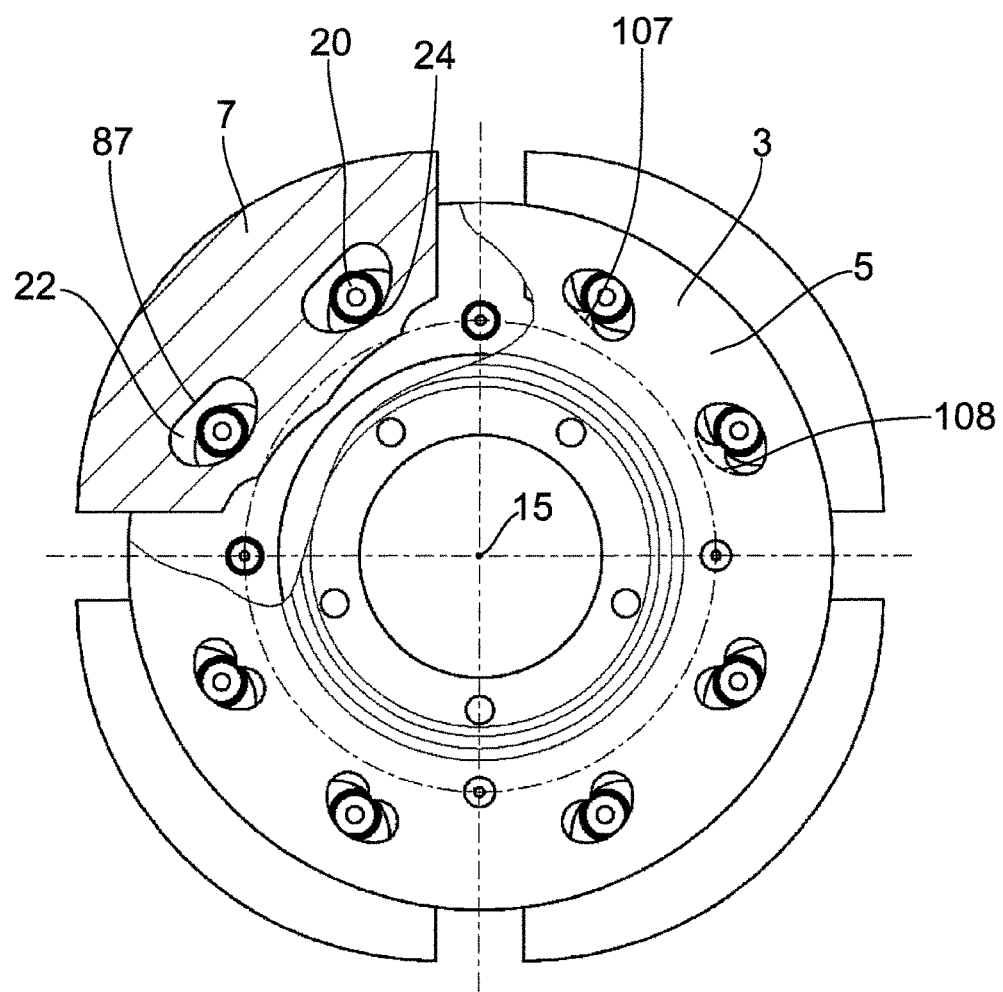
FIG. 14 is a view similar to FIG. 13, but with guideways in the damper masses and in the damper mass carrier which differ from those in FIG. 14.

There is a further step for reducing the noise of impact on the stop 31. This step already follows from FIGS. 1 and 2, but will be discussed in the following referring to FIG. 13 or FIG. 14. While the guideways 22a which are shown in FIG. 13 and which correspond to the prior art, have a narrowed portion 85 opposite the respective initial region 24a, the guideways 22 at the comparable location in FIG. 14 are formed at least substantially with a planar shape 87, whereas in FIG. 1 or FIG. 2 they are even formed with a widening 88 in direction away from the initial region 24. The shaping of the guideway 22 with a planar shape 87 or with a widening 88 is advantageous during a change in operating condition, namely, when a centrifugal force that previously exceeded the weight force drops below the weight force owing to a decrease in the operating speed. As has already been described referring to FIG. 2, the damper masses 7 will then drop down through gravitational force. In the embodiment of the guideways 22 according to FIG. 13, the respective rolling body 20 must then roll along the narrowed portion 85 so that a momentum is generated which causes considerable noise when the damper masses 7 drop subsequently. By shaping the guideway 22 with a planar shape 87 or with a widening 88, the damper masses 7 can move along the outer contour of the guideways 22 by the respective rolling bodies 20 substantially without a troublesome momentum and therefore strike the associated stop 31 less noisily. A comparable advantage results when the guideways 13 in the damper mass support elements 5 of the damper mass carrier 3 are also formed with a planar shape 107 or widening 108, but at the radially inner side in this case. The planar shaping 107 and widening 108 in FIG. 14 are both shown in dashed lines. Of course, in implementing the planar shaping 107 or widening 108, at least some of the guideways 13 are formed in a corresponding manner and not only the one guideway 13 shown in FIG. 14.

Figure 5:
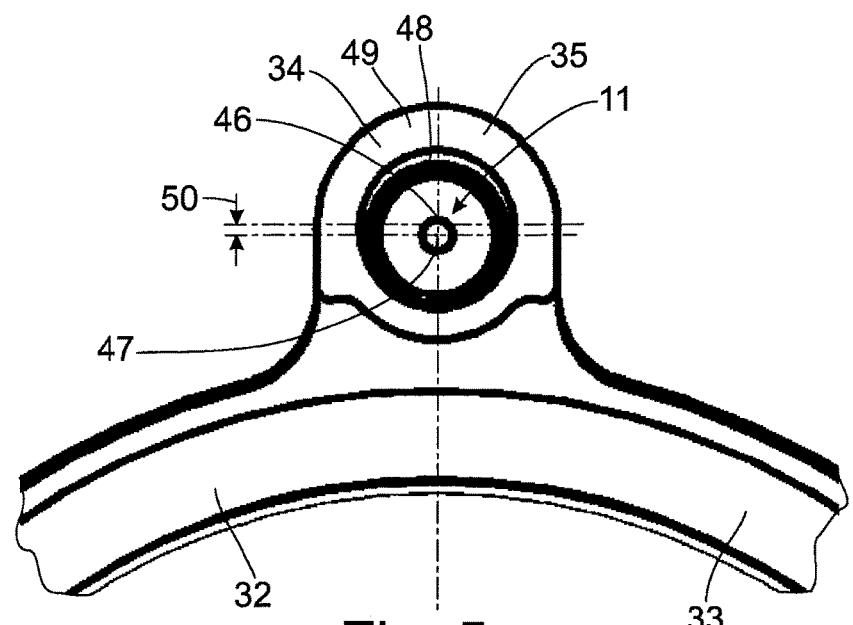
FIG. 5 is a detail of one of the holders of the stop which are shown in FIG. 3 with radial offset between the holder and a stop receiver enclosed by the latter.

As has already been described, during operating states in which the centrifugal force falls below the weight force, the second contact regions 30 of the damper masses 7 engage the respectively associated holder 34 and, therefore, the stop receiver 35 of the annular component part 32. In order to dampen this impact of the respective damper mass 7, the holder 34, and therefore the stop receiver 35, is formed according to FIG. 5 so that its center axis 46 is offset from the center axis 47 of the respective stop piece 11 by an axial offset 50. The stop pieces 11 are arranged such that they are located in the radially inner region of the respective holder 34 when the annular component part 32 is fitted on. Accordingly, a free space 48 occurs in the holder 34 radially outwardly of the respective stop piece 11 which allows a resiliency of the wall 49 of the holder 34 within the scope of elasticity of this wall 49.

Figures 6, 7:
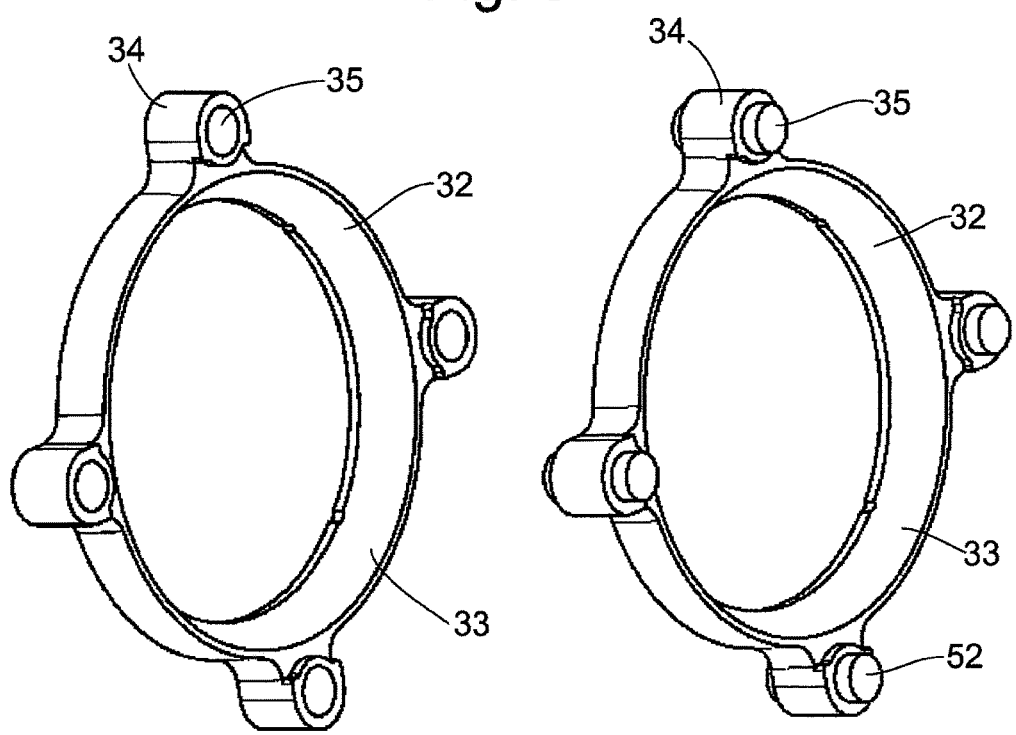

While the annular component part 32 according to FIG. 6 has the configuration of the stop receivers 35 that has been described thus far, namely, with holder 34 intended for receiving the spacers 11, FIG. 7 shows a construction of the stop receivers 35 in which studs 52 are secured in the holders 34 and protrude axially over the holders 34 to engage in corresponding recesses of the damper mass support elements 5.

Figure 8:
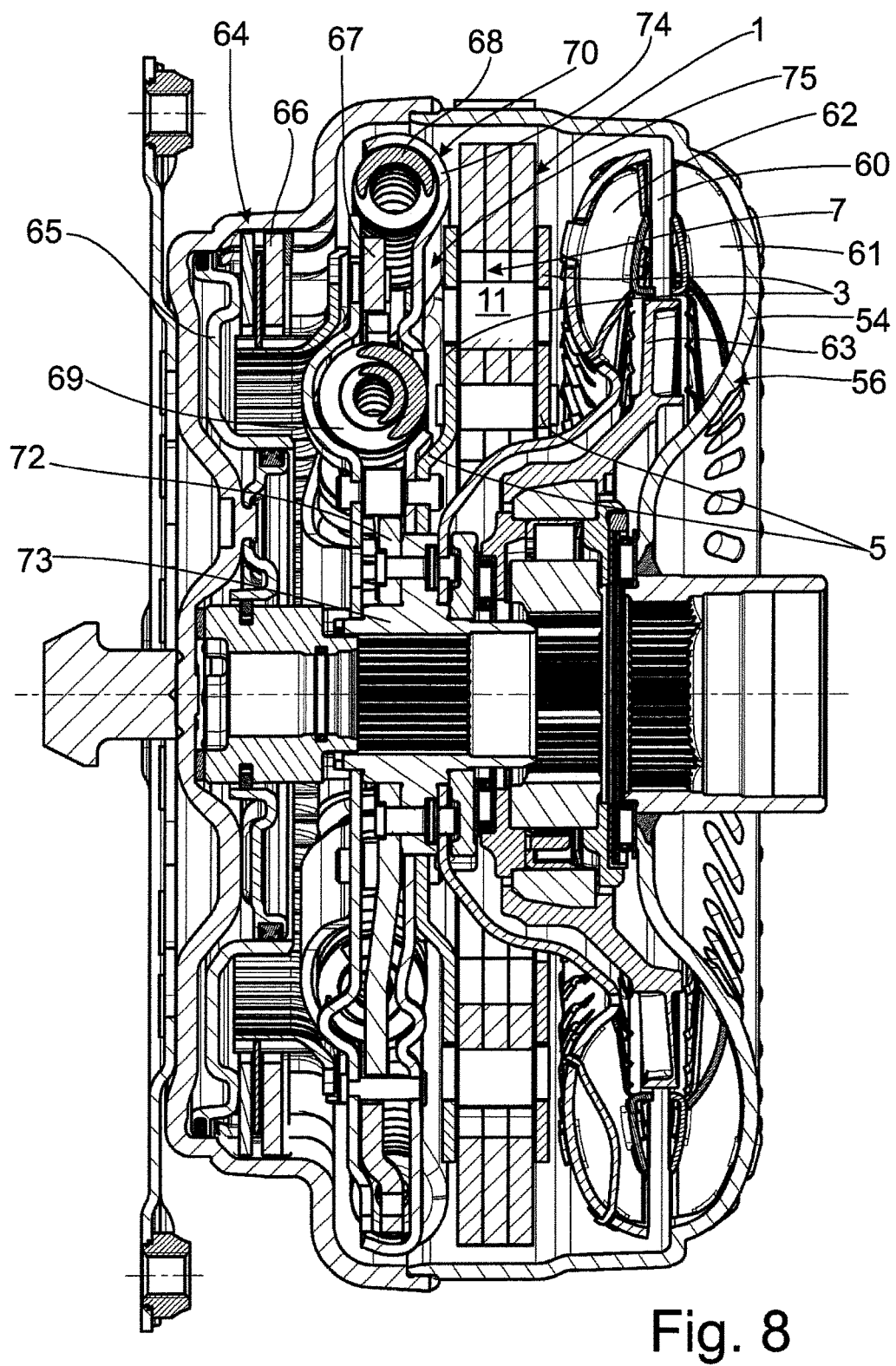
FIG. 8 is a view of the torsional vibration damper in a hydrodynamic coupling arrangement.

According to FIG. 8, the torsional vibration damper 1 is provided in the housing 54 of a hydrodynamic coupling arrangement 56. This hydrodynamic coupling arrangement 56 has a hydrodynamic circuit 60 with impeller 61, turbine 62 and stator 63 and a clutch mechanism 64 having a clutch piston 65 and friction disk clutch 66. Depending on the actuation of the clutch piston 65, the clutch mechanism 64 is movable between an engaged position and a disengaged position. The clutch mechanism 64 is connected to a torsion damper input 67 of a damping device 70 having two circumferential spring sets 68, 69, the torsion damper output 72 of the damping device 70 cooperates with an output 73. An intermediate torsion damper component 74 at which a damper mass support element 5 of the damper mass carrier 3 of the torsional vibration damper 1 is received, fixed with respect to relative rotation is operative between the two circumferential spring sets 68, 69. Together with the torsional vibration damper 1, the damping device 70 forms a torsional vibration damper unit 75.

To the extent that the torsional vibration damper 1 is shown, FIG. 8 clearly shows, apart from the two support elements 5 of the damper mass carrier 3, the spacers 11 connecting the latter to one another as well as the damper masses 7. FIG. 9 also shows the same component parts but, beyond this, also shows the annular component part 32, which has the stop profile 40 and which therefore acts as stop 31. As is clearly visible in FIG. 9, the annular component part 32 is located radially inwardly of the damper masses 7 and axially between the damper mass support elements 5. Although the annular component part 32 is received via spacers 11 at the damper mass support elements 5 in the manner already described, it is supported by its radial inner side at a turbine hub 77 which is attached to output 73.

While spacers 11 are provided in the embodiment according to FIG. 9, these spacers 11 do not take on any function with respect to the annular component part 32. Instead, the annular component part 32 is supported by its radial inner side at the turbine hub 77 and, via holding projections 79 distributed along the circumference and which extend through respectively associated recesses 80 of the turbine hub 77, is secured to the turbine hub 79 and, therefore, to the turbine 62 in that the holding projections 79 have, at their free ends, latch noses 81 by which they engage behind the turbine hub 79.

Figure 11:
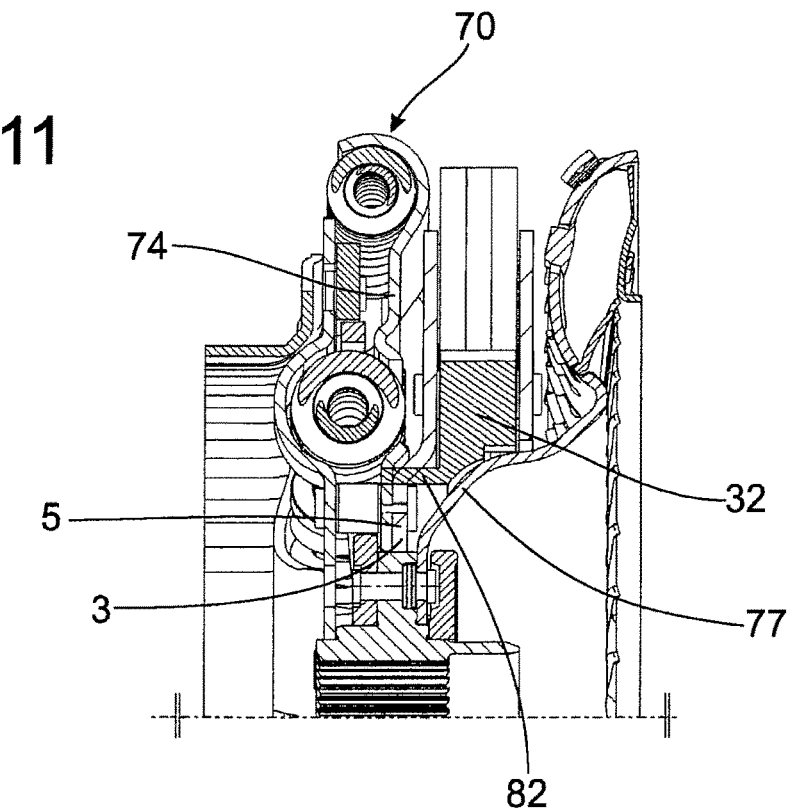
FIG. 11 is a stop with stop receivers which differ from those in FIG. 10 and without radial support of the stop at a component part of the coupling arrangement.
Figure 12:
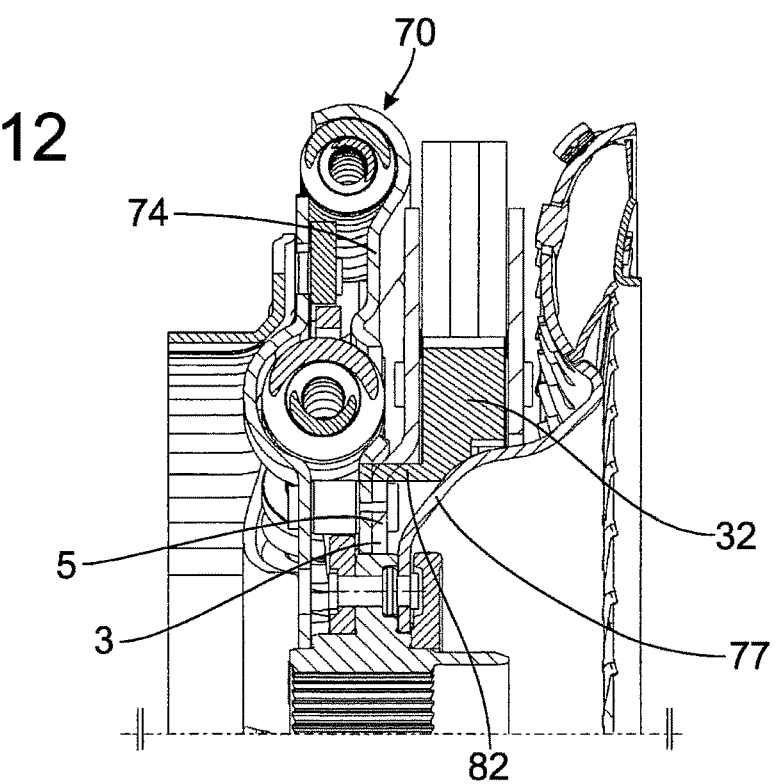
FIG. 12 is a view similar to FIG. 11, but with radial support of the stop at a component part of the coupling arrangement.

Alternatively, according to FIG. 11 or FIG. 12, the annular component part 32 can also be secured to the intermediate torsion damper component 74 of the damping device 70 by holding projections 82. To this end, the holding projections 82 engage in corresponding recesses 83 of the damper mass support element 5 adjacent to the intermediate torsion damper component 74 in a manner not shown in more detail. For this purpose, referring to FIG. 12, the annular component part 32 can be supported by its radial inner side at the turbine hub 77, but can also operate independently from the turbine hub 77 referring to FIG. 11.

The holding projections 79 or 82 form alternative constructions of the stop receiver 35 in place of spacer 11 or stud 52.

The embodiment of the torsional vibration damper 1 shown in FIGS. 15 and 16 again shows the spacers 11 for connecting the damper mass support elements 5 of the damper mass carrier 3. These spacers 11 are either covered with a plurality of annular sheaths 90a, 90b, 90c, each annular sheath 90a to 90c being associated with a region portion of the respective damper masses 7, or the spacers 11 are covered with an individual bushing-shaped sheath in each instance, and the entire damper mass 7 in axial direction is associated with the latter. These sheaths 90a to 90c are preferably formed of plastic and are accordingly capable of damping the stop when the respective second contact region 30 of the stop side 42 of the damper mass 7 moves into operative contact with the sheaths 90a to 90c of the spacers 11. Further, the spacers 11 are given the task of centering the annular component part 32 relative to the central axis 15 so that there are also stops 31 provided at the annular component part 32 in this embodiment which are engaged by the respective first contact regions 29 of the stop sides 42 of the damper masses 7 in operating conditions in which the centrifugal force falls below the weight force. With respect to the annular component part 32, the spacers 11 also act as stop receivers 35 but, in contrast to the previous embodiments, do not receive the annular component part 32 in a positive engagement. Instead, the annular component part are held by the stop receivers 35 in a frictional engagement and therefore so as to experience the same movement as the latter; however, if there is no frictional connection to the stop receivers 35, there can be a relative movement of the annular component part 32 relative to the spacers 11 and, therefore, relative to the damper masses 7. In case of a floating bearing support of the annular component part 32 with respect to the spacers 11, the annular component part 32 can have a greater resiliency and, therefore, improved damping characteristics when the damper masses 7 engage by their stop sides 42.

Figure 15:
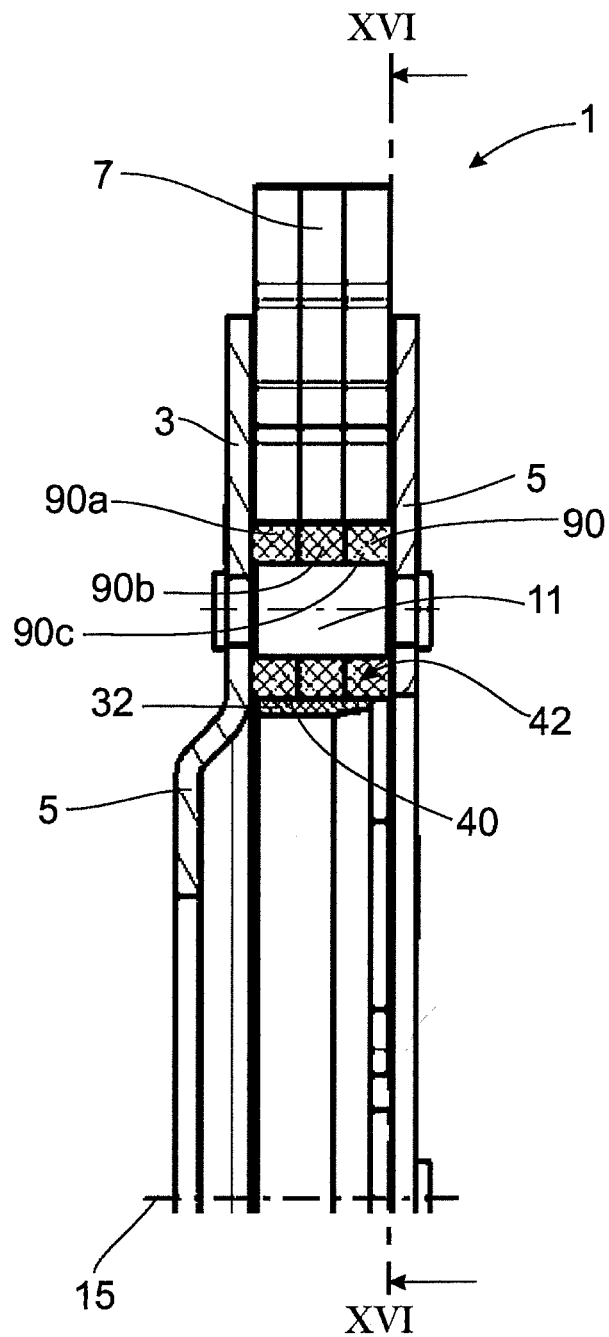
FIG. 15 is a sectional view of a construction of the torsional vibration damper with stops without positive engagement connection to stop receivers.
Figure 16:
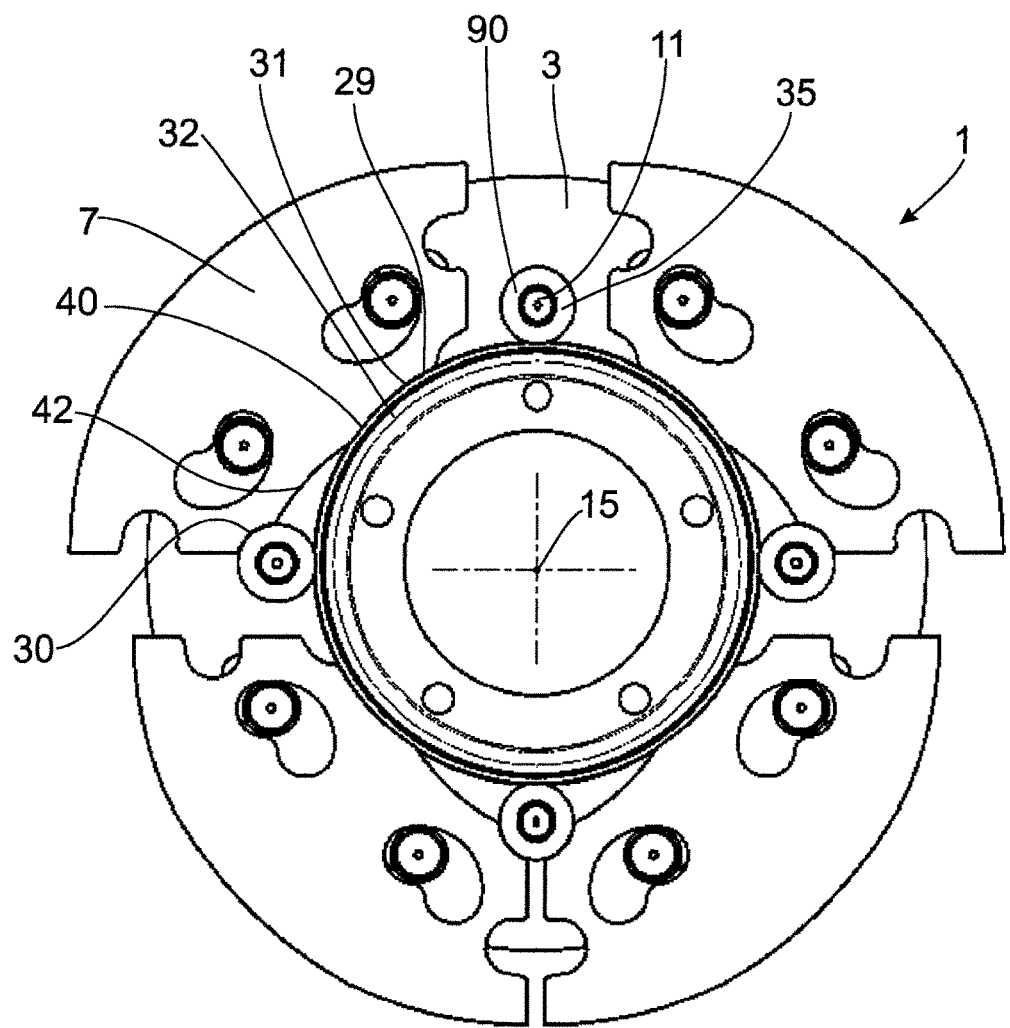
FIG. 16 is a top view from direction XVI-XVI in FIG. 15.
Figure 17:
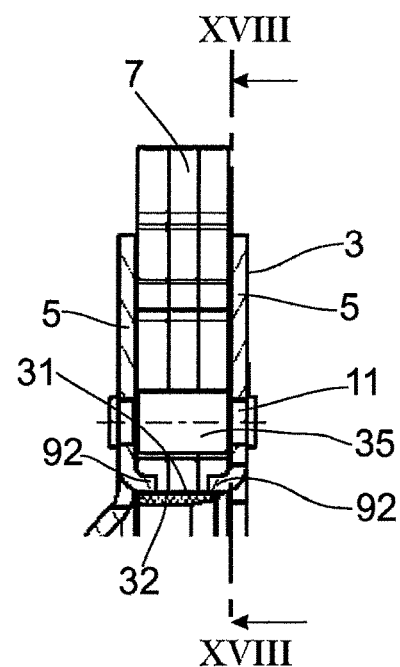
FIG. 17 is a view similar to FIG. 15, but with a different construction of the stop receivers.
Figure 18:
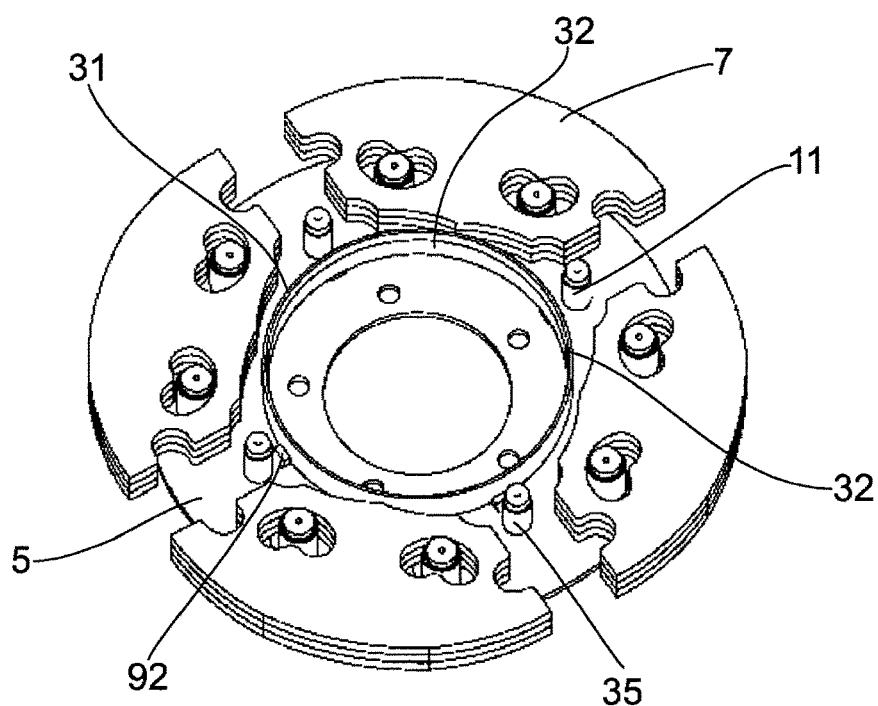
FIG. 18 is a top view from direction XVIII-XVIII in FIG. 17.
Figure 19:
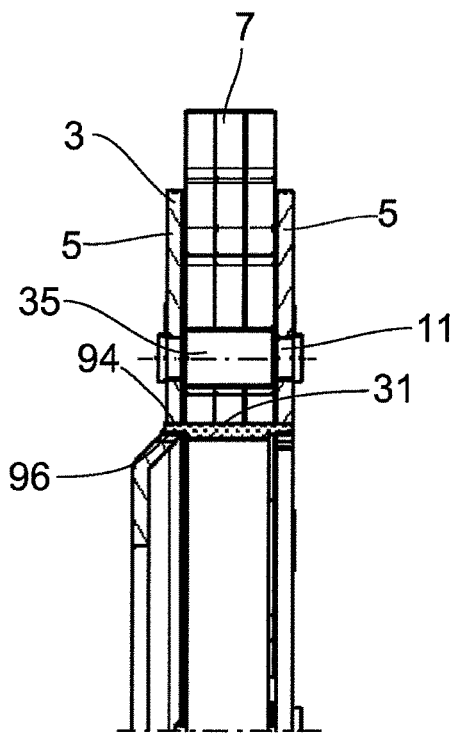
FIG. 19 is a view similar to FIG. 15 with yet another configuration of the stop receivers.
Figure 20:
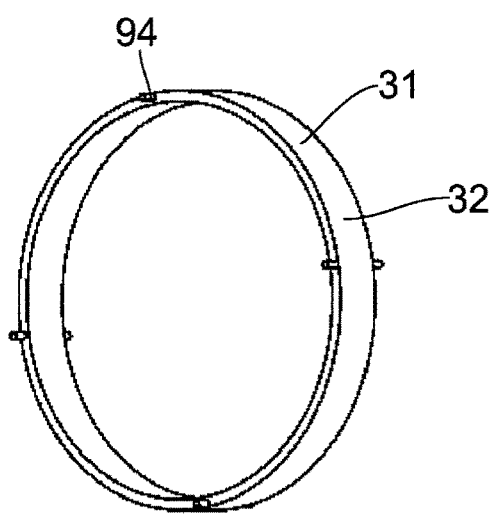
FIG. 20 is a detail of an annular component part with stops.

FIGS. 17, 18, 19 and 20 shows another embodiments with respect to FIGS. 15 and 16. In FIGS. 17 and 18, axial bends 92 are provided at the damper mass support elements 5 of the damper mass carrier 3 preferably in the circumferential region of the spacers 11, but radially inwardly of the latter. Instead of the spacers 11, these axial bends 92 engage around the annular component part 32 so as to center it. In FIGS. 19 and 20, axial recesses 96 in which axial projections 94 provided at the annular component part 32 engage are provided at the damper mass support elements 5 of the damper mass carrier 3, also preferably in the circumferential region of the spacers 11, but radially inwardly of the latter. In this case, the annular component part 32 is centered by means of the axial projections 94. The function of the stop receivers 35 is taken over by the spacers 11 in the embodiments in FIGS. 17 to 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damper comprising:
   a hydrodynamic coupling arrangement housing;
   at least one damper mass having a stop side with a geometric shaping arranged in the hydrodynamic coupling arrangement housing;
   at least one stop associated with the at least one damper mass having a stop profile at its side facing a stop side of the at least one damper mass; and
   a damper mass carrier with the at least one stop, the damper mass carrier having a damper mass support element at which the at least one damper mass is arranged and the at least one damper mass is configured to be movable relative to the damper mass carrier,
   two circumferential spring sets between which the damper mass support element is arranged;
   wherein the at least one stop has at least a partial axial overlap with the at least one damper mass in an extension direction of a central axis,
   wherein at least one stop receiver is associated with the at least one stop for the at least one damper mass,
   wherein the geometric shaping has at least one first contact region operative at least substantially in radial direction and at least one second contact region operative at least substantially in tangential direction, the first contact region configured to be brought into operative connection with the stop, and the second contact region configured to be brought into operative connection with the stop receiver,
   wherein the two circumferential spring sets are connected in series, each of the circumferential spring sets having a plurality of circumferential spring set parts that operate in parallel to one another; and
   wherein the geometric shaping is formed with two second contact regions configured for mutually opposite working directions of the at least one damper mass, each of the second contact regions is configured with respect to its shape to a shape of the at least one stop receiver.

2. The torsional vibration damper according to claim 1, wherein the first contact region is provided between two second contact regions that adjoin at circumferential end sides.

3. The torsional vibration damper according to claim 1, wherein the first contact region is formed of two parts configured for opposite work directions of the at least one damper mass, wherein each of the two parts is configured with respect to its shape to a shape of the at least one stop profile stop of the at least one stop.

4. The torsional vibration damper according to claim 3, wherein each part of the first contact region has, at its side facing the stop profile of the stop, a curvature shape configured to a curvature shape of the stop profile of the stop.

5. The torsional vibration damper according to claim 1, wherein each second contact region has, at its side facing the at least one stop receiver, a curvature shape which is adapted to a curvature shape of the at least one stop receiver.

6. The torsional vibration damper according to claim 1, further comprising a plurality of stops for a plurality of damper masses, the stops are received in circumferential direction on a common, substantially annular component part.

7. The torsional vibration damper according to claim 1, wherein the at least one stop and the at least one stop receiver extend at least partially radially inwardly of the at least one damper mass.

8. The torsional vibration damper according to claim 7, wherein the stop in association with the respective stop receiver is provided with at least one holder that encloses the stop receiver.

9. The torsional vibration damper according to claim 8, wherein the at least one holder is configured to form a free space with an axial offset relative to a respective stop receiver.

10. The torsional vibration damper according to claim 1, wherein the at least one stop receiver is formed by at least one holding projection fixedly held through a component part, after one of:
    engaging through an associated recess and
    through engagement in an associated recess of the component part of a coupling arrangement.

11. The torsional vibration damper according to claim 10, wherein the stop is supported by its radially inner side at the component part of the coupling arrangement.

12. The torsional vibration damper according to claim 1, wherein the at least one stop for the damper mass is displaceable in circumferential direction relative to the damper mass.

13. The torsional vibration damper according to claim 12, wherein the at least one stop receiver is associated with the at least one stop for the damper mass, the at least one stop receiver being configured to center the stop relative to the central axis.

14. The torsional vibration damper according to claim 13, further comprising a sheath associated with the at least one stop receiver.

15. The torsional vibration damper according to claim 1,
    wherein the damper mass carrier has two first guideways that cooperate with two second guideways of the at least one damper mass,
    wherein rolling bodies for receiving the respective damper mass at the at least one damper mass carrier configured to allow relative movement thereof connect the first guideways and the second guideways to one another,
    wherein in at least one of the second guideways have a radially outer region having one of a planar shape and a widening so that a radial extension of the respective second guideway has a maximum in a circumferential region of the respective initial region and the first guideways have in the radially inner region one of a planar shape and a widening so that the radial extension of the respective guideway has a maximum in the circumferential region of the respective initial region.

16. The torsional vibration damper according to claim 1, wherein the at least one stop for the at least one damper mass is one of secured to or centered at one of the damper mass carrier, a component part of a damping device of a coupling arrangement, and a component part of the coupling arrangement.

17. The torsional vibration damper according to claim 1 further comprising:
    a coupling arrangement, having a torsional vibration damper unit comprising a damping device with the two circumferential spring sets, a torsion damper input, and a torsion damper output,
    wherein one of the torsion damper input, the torsion damper output, and an intermediate torsion damper component located between the torsion damper input and the torsion damper output is configured to receive the damper mass support element of the damper mass carrier to be fixed with respect to relative rotation.

18. The torsional vibration damper according to claim 17, wherein the torsional vibration damper unit is coupled to a clutch mechanism.

19. The torsional vibration damper according to claim 1, wherein the hydrodynamic coupling arrangement comprises:
- a hydrodynamic circuit with an impeller, a turbine, and a stator; and
- a clutch mechanism having a clutch piston and a friction disk clutch,
- wherein based at least in part on an actuation of the clutch piston, the clutch mechanism is movable between an engaged position and a disengaged position,
- wherein the clutch mechanism is coupled to a torsion damper input.

* * * * *